United States Patent [19]

Baker et al.

[11] Patent Number: 5,754,972
[45] Date of Patent: May 19, 1998

[54] SPEECH RECOGNITION SYSTEM FOR LANGUAGES WITH COMPOUND WORDS

[75] Inventors: James K. Baker, West Newton; Paul G. Bamberg, Framingham; Jed M. Roberts, Newton; Caroline B. Huang, Belmont; Stijn VanEven, Newton; Claudia L. E. Ellermann, Charlestown, all of Mass.

[73] Assignee: Dragon Systems, Inc., Newton, Mass.

[21] Appl. No.: 437,965

[22] Filed: May 10, 1995

Related U.S. Application Data

[63] Continuation of Ser. No. 846,695, Mar. 6, 1992, abandoned.

[51] Int. Cl.$^6$ .................................................. G10L 1/06
[52] U.S. Cl. ........................ 704/200; 704/2; 704/251
[58] Field of Search ........................ 395/2, 2.6, 2.64–2.66; 364/419.02, 419.06; 381/41, 43; 704/200, 251, 255–257, 2, 6

[56] References Cited

U.S. PATENT DOCUMENTS

| 3,647,978 | 3/1972 | Hill | 395/2 |
|---|---|---|---|
| 4,624,008 | 11/1986 | Vensko et al. | 395/2.66 |
| 4,718,094 | 1/1988 | Bahl et al. | 395/2.64 |
| 4,749,353 | 6/1988 | Breedlove | 395/2 |
| 4,783,803 | 11/1988 | Baker et al. | 381/42 |
| 4,803,729 | 2/1989 | Baker | 395/2.63 |
| 4,805,218 | 2/1989 | Bamberg et al. | 395/2.63 |
| 4,805,219 | 2/1989 | Baker et al. | 395/2.5 |
| 4,829,576 | 5/1989 | Porter | 395/2.44 |
| 4,829,578 | 5/1989 | Roberts | 395/2 |
| 4,837,831 | 6/1989 | Gillick et al. | 381/43 |
| 4,866,778 | 9/1989 | Baker | 395/2.44 |
| 4,868,750 | 9/1989 | Kucera et al. | 364/419.08 |
| 4,903,305 | 2/1990 | Gillick et al. | 395/2.5 |
| 4,914,703 | 4/1990 | Gillick | 395/2.54 |
| 4,914,704 | 4/1990 | Cole et al. | 381/43 |
| 4,947,438 | 8/1990 | Paeseler | 395/2.66 |
| 4,959,864 | 9/1990 | Van Nes et al. | 395/2.6 |
| 4,984,178 | 1/1991 | Hemphill et al. | 395/2.64 |
| 5,005,203 | 4/1991 | Ney | 395/2.64 |
| 5,027,406 | 6/1991 | Roberts et al. | 395/2 |
| 5,027,408 | 6/1991 | Kroeker et al. | 395/2.63 |
| 5,065,318 | 11/1991 | Kugimiya et al. | 364/419.06 |
| 5,164,900 | 11/1992 | Bernath | 395/2 |
| 5,225,981 | 7/1993 | Yokogawa | 364/419.02 |

FOREIGN PATENT DOCUMENTS

2082820   3/1982   United Kingdom.

OTHER PUBLICATIONS

Kenji et al. (1991) "Processing Unknown Words in Continuous Speech Recognition" *IEICE Transactions* E74(7): 1811–1815.

Patent Abstracts of Japan, vol. 6(159)(P-136), 20 Aug. 1982 & JP-A-57 075349 (Nippon Telegraph & Telephone) 11 May 1982, abstract.

Supplementary Search Report, EP 93 90 7431, Dec. 19, 1995.

Bahl, et al., IEEE, Sep., 1988, pp. 489–492, "Obtaining Candidate Words by Polling in a Large Vocabulary Speech Recognition System."

Bahl, et al., IEEE, Feb., 1989, pp. 345–347, "Matrix Fast Match: A Fast Method for Identifying a Short List of Candidate Words for Decoding".

Bahl, et al., IEEE, Feb., 1990, pp. 85–88, "Constructing Graps of Aconstically Confusable Words".

Zachary, The Wall Street Journal, Feb. 24, 1992, pp. A3, A7, Apple Unveils 'Breakthrough' In Technology : Macintosh.

PCT International Search Report, Mailed 03 Jun. 1993, for prosecution of PCT/US93/02232.

Bandara et al. "Handling German compound words in an isolated–word speech recognizer"—Contribution to 1991 IEEE Workshop on Speech Recognition, Arden House, Harriman, NY, Dec. 15–18.

*Primary Examiner*—Kee M. Tung
*Attorney, Agent, or Firm*—Thomas J. Engellenner; Lawrence E. Monks; Lahive & Cockfield, LLP

[57] ABSTRACT

A system and associated methods for recognizing compound words from an utterance containing a succession of one or more words from a predetermined vocabulary. At least one of the words in the utterance is a compound word including at least two formatives in succession, wherein those formatives are words in the vocabulary.

24 Claims, 5 Drawing Sheets

SPEECH RECOGNITION SYSTEM FOR LANGUAGES WITH COMPOUND WORDS

This application is a continuation of application Ser. No. 07/846,695, filed on Mar. 6, 1992, now abandoned.

REFERENCE TO RELATED PATENTS

The subject matter of this application is related to that disclosed in U.S. Pat. No. 4,783,803 entitled "Speech Recognition Apparatus and Method", U.S. Pat. No. 4,866,778 entitled "Interactive Speech Recognition Apparatus" and U.S. Pat. No. 5,027,406 entitled "Method for Interactive Speech Recognition and Training", assigned to the assignee of the present application. Those patents are incorporated herein by reference.

BACKGROUND

This invention relates generally to speech recognition systems, and in particular, to methods and apparatus for recognizing compound words.

Data processing systems for recognizing human speech, such as systems capable of transcribing dictation, have been developed. Due to advances in computer technology, as well as advances in the development of speech recognition algorithms, those systems have become increasingly more powerful. For example, assignee of the present invention currently markets a system capable of recognizing 30,000 words. Many of the features of that system are described in the above referenced patent, U.S. Pat. No. 4,783,803.

Many present speech recognition systems operate by matching a representation of an acoustic signal generated in response to an utterance of the word to be recognized against acoustic descriptions, or models of words in a vocabulary. Typically, an analog to digital converter converts the acoustic signal, generated by speaking the word to be recognized, into a digital representation. That digital representation is subsequently transformed into a frequency domain signal. The frequency domain signal consists of a sequence of frames, each giving the amplitude of the acoustic signal in one of a plurality of frequency bands over a brief interval of time. Such systems commonly operate by comparing the sequence of frames, derived from the word to be recognized, with a sequence of nodes, or frame models, stored in the active vocabulary for the system.

The performance of early frame matching systems was relatively poor. The individual sounds which make up a given word are seldom, if ever, spoken at exactly the same rate or in exactly the same manner in any two utterances of that word. Consequently, two techniques developed for improving the performance of those systems. The first is probabilistic matching. According to probabilistic matching the system determines the likelihood that a particular frame of an utterance corresponds to a particular node in the acoustic model of a word. The likelihood determination is a function of how closely the actual amplitude of each frequency band of the spoken frame matches the expected amplitude of the frequency bands stored as frame models. Probabilistic matching also takes into account how the deviation between the actual and expected amplitudes in each frequency band compare to the expected deviation for such values. Probabilistic matching causes speech recognition systems to have an improved ability to cope with variations in audio signals which occur with respect to different utterances of the same word. It also enables systems to deal more effectively with noise which is commonly present during speech recognition tasks.

The second technique which improved the performance of frame matching systems is dynamic programming. Dynamic programming provides a method to find an optimal, or near optimal, match between the sequence of frames produced by an utterance and the sequence of nodes contained in the model of a word. It does this by expanding and contracting the duration of each node in the acoustic model of a word to compensate for natural variations which occur in different utterances of the same word.

While probabilistic matching and dynamic programming substantially improve the accuracy with which spoken words are recognized by a data processing system, both techniques are computationally intensive. To perform the comparisons required by dynamic programming and probabilistic matching may require many millions of computer instructions. Consequently, as the number of words stored in the active vocabulary increases so does the time required to identify an utterance.

The prior art has developed a variety of methods for dealing with the excessive computational demands introduced by large vocabulary recognition systems. One method provides the system with an artificial grammar which limits the vocabulary that the system can recognize at any one time to a sub-set of the overall vocabulary.

Another prior art technique for making large vocabulary recognition more efficient is commonly referred to as "pre-filtering" or "pruning." Both pre-filtering and pruning involve reducing the number of comparisons which a program considers, by eliminating from further consideration those acoustic models which do not appear to warrant further computation. For example, in the system disclosed in U.S. Pat. No. 4,783,803, the dynamic programming algorithm produces a score for each word in its active vocabulary after each frame of an utterance is received. This score corresponds to the likelihood that the frames received so far match the given word. After the score for each word in the active vocabulary is updated, it is compared with the best score produced for any word. If the difference between the score for a given word and the best score exceeds a certain threshold, that given word is removed from the active vocabulary and future frames are no longer compared against it.

The system described in U.S. Pat. No. 4,783,803 further reduces computational demands and the likelihood of confusion by using a language model. A language model predicts the relative likelihood of the occurrence of each word in the system's vocabulary, given the word spoken before it. Language model probabilities are calculated by analyzing a large body of text and determining from it the number of times that each word in the vocabulary is preceded by each other word in the vocabulary.

The prior art systems, upon recognizing a spoken word, typically display a choice list of the words most likely to be the spoken word. However, the amount of time required before some prior art systems display any words for the operator to chose increases with the size of the recognition vocabulary. In large vocabulary systems, the prior art systems are relatively slow. A later prior art system utilizes methods, such as alphabetic filtering, to improve system response time. Alphabetic filtering enables a user to narrow the field of search by specifying a character string contained in the spoken word. The features of that system are further described in U.S. Pat. No. 4,866,778.

The performance of present speech recognition systems is impressive when compared to similar systems of a short time ago. Nevertheless, there is still a need for further improvement. For example, for a speech recognition system to be of practical use for many tasks, it needs to be able to recognize a large vocabulary of words. An important sub-set of those words are compound words. What constitutes a "compound word" may vary depending on which language is being referred to. For example, in French and Italian, articles and prepositions can be combined with other words which begin with a vowel, yielding compound words such as "l'art" (the art) and "dell'orologio" (of the clock). In Spanish, verbs can be combined with a pronoun as in the case of ponerlo "to put". In German, compound words are invented and used in roughly the same way as English compound nouns, such as "Finanzminister" for "finance minister." In Japanese and Chinese, a large proportion of the vocabulary consists of compound words appearing as a sequence of characters. Word boundaries are not easily discernible from the text of those two languages because there is equal spacing between each pair of characters.

Prior art systems achieve approximately a ninety-five percent coverage of the words in the American English language. It is considerably more difficult to achieve a comparable coverage in languages having a high proportion of words formed by combining components. According to prior art systems, to reach the desired level of coverage, the active vocabulary of the system would have to be expanded by creating and storing acoustic models for a significant number of compound words. Such an approach would involve an impractical amount of storage capacity. Additionally, the problem of designing computationally efficient speech recognition systems is made even more difficult by significantly increasing the number of acoustic models stored in the system library.

Accordingly, it is an object of the present invention to provide an improved word recognition system that recognizes compound words spoken by a user.

It is a further object of the invention to provide a word recognition system which does not require incorporating compound words to be recognized into its active vocabulary.

It is another object of the invention to provide a word recognition system that automatically combines spoken formatives which have a high likelihood of being a compound word.

It is also an object of the invention to provide a system which enables a user to combine into a compound word, a spoken string of formatives.

It is an additional object of the invention to provide a word recognition system that recognizes compound words which are spoken by a user as continuous speech.

It is a further object of the invention to provide a word recognition system that enables a user to cause words, previously recognized by the system as isolated formatives, to be combined into a compound word.

It is another object of the invention to provide a word recognition system that enables a user to cause words, previously recognized by the system as compound words, to be divided into isolated formatives.

Other objects, features and advantages of the invention will be apparent from the following description of the preferred embodiments thereof, and from the claims.

SUMMARY OF THE INVENTION

Briefly, the present invention is a system and associated methods for recognizing compound words from an utterance containing a succession of one or more words from a predetermined vocabulary. At least one of the words in the utterance is a compound word including at least two formatives in succession, wherein those formatives are words in the vocabulary.

The system includes a word recognizer element. The word recognizer element is selectively operative in a first mode for identifying words corresponding to the compound words, in response to processing the utterance spoken by the user. The word recognizer is also selectively operative in a second mode for identifying words corresponding to the compound words, in response to processing a succession of formatives spoken by a user, wherein each of the formatives is representative of a correspondingly positioned formative in the compound word. Optionally, the word recognizer may include an element for recognizing the compound words from an utterance of words spoken in isolation or spoken as continuous speech.

The system also includes a user controlled element for determining the mode of the word recognizer. The user controlled element may be responsive to a user generated auditory signal or to a user generated keyboard command to determine the mode of the word recognizer.

Optionally, the system is operative in a sub-mode of the above mentioned second mode. In the sub-mode, the word recognizer element identifies words corresponding to the compound words, in response to processing keywords, entered by a user. Each of the keywords is representative of a correspondingly positioned character in the compound word. The keywords may correspond to any alphabet type representations. For example, the keywords may correspond to International Communication Alphabet words. Alternatively, they may correspond to German Telephone Code words. Additionally, the user may be able to enter the keywords through user generated auditory signals or through user generated keyboard commands. The functions encompassed by this sub-mode may also be implemented as an independent third mode of operation in the word recognizer element.

In an alternate embodiment, the invention is a system and associated methods for recognizing words from an utterance containing a succession of one or more spoken words from a predetermined vocabulary. The apparatus includes a word recognizer and a user controlled element for mode selection.

The word recognizer is selectively operative in a first mode for determining and displaying a first plurality of words in the vocabulary as a current candidate word list for one of the spoken words, in response to processing a succession of keywords spoken by a user. Each of the keywords is representative of a correspondingly positioned word component in the spoken word. Additionally, each of the plurality of words in the displayed list begins with the succession of word components represented by the succession of keywords. The word components may be selected from the group consisting of formatives and characters.

The word recognizer is also selectively operative in a second mode for identifying at least a portion of the spoken words from the current candidate word list, in response to one or more commands entered by a user. Those commands are representative of the first k characters of the nth word in the current candidate word list, where k and n are integers and the k characters represent the first k characters of the spoken word. The user may enter the commands through auditory signals or through keyboard commands.

In the second mode of operation, the word recognizer also determines, in response to the commands entered by a user, a second plurality of words in the vocabulary as the current candidate word list for the spoken word. Each of the words in that second plurality begin with the k characters and are displayed as the current candidate word list.

Optionally, the word recognizer, in response to one or more commands entered by the user, may identify an additional i characters in the nth word. In this case i is an integer and the i characters represent the first i characters following the k characters previously identified.

Additionally, the word recognizer, in response to one or more commands entered by the user, may exclude j characters from the k characters previously identified. In this case j is an integer and the j characters represent the j characters immediately preceding the kth character of the nth word.

The word recognizer may also include an element for recognizing the words from the utterance, wherein the utterance includes one or more words spoken as continuous speech. Alternatively, the word recognizer may include an element for recognizing words, wherein the utterance includes one or more words spoken in isolation.

The word recognizer may also include a completion element, selectively operative in response to the identification of a portion of the spoken word, for determining the remainder of the spoken word. The completion element may include an element for processing a succession of key words or formatives entered by a user, wherein each of the key words or formatives is representative of a correspondingly positioned character in the remainder of the spoken word, to identify the succession of characters represented by the succession of the keywords or formatives as the remainder of the spoken word.

In another embodiment, the invention includes a system and methods for recognizing compound words from an utterance containing a succession of one or more words from a predetermined vocabulary where at least one of the words is a compound word, including at least two formatives in succession. According to this embodiment, the invention includes a processing element, a word recognizer element and a combination element.

The processing element is for processing a succession of formatives spoken by a user and for associating, with each of the spoken formatives, a score representative of a likelihood of the spoken formative being included in the compound word.

The word recognizer element, responsive to those associated scores, identifies as the compound word, those successively spoken formatives having a combined score corresponding to a predetermined criteria. According to the invention, each of the formatives is representative of a correspondingly positioned formative in the compound word.

The combination element generates a signal representative of the combination of the successive formatives identified by the word recognizer means. The signal is representative of the compound word.

Optionally, this embodiment includes a user controlled element for decomposing into a signal representative, of the identified formatives, the identified compound word. This user controlled element may be responsive to a user generated auditory signal or to user generated keyboard commands.

In another embodiment, the invention includes an apparatus and methods for recognizing compound words from an utterance containing a succession of one or more words from a predetermined vocabulary. At least one of the words in the succession is a compound word, including at least two formatives in succession. The formatives are words in the vocabulary. The apparatus includes a user controlled element for generating a signal representative of a compound word, wherein the signal corresponds to selected ones of the formatives uttered in succession.

DETAILED DESCRIPTION

Figure 1:
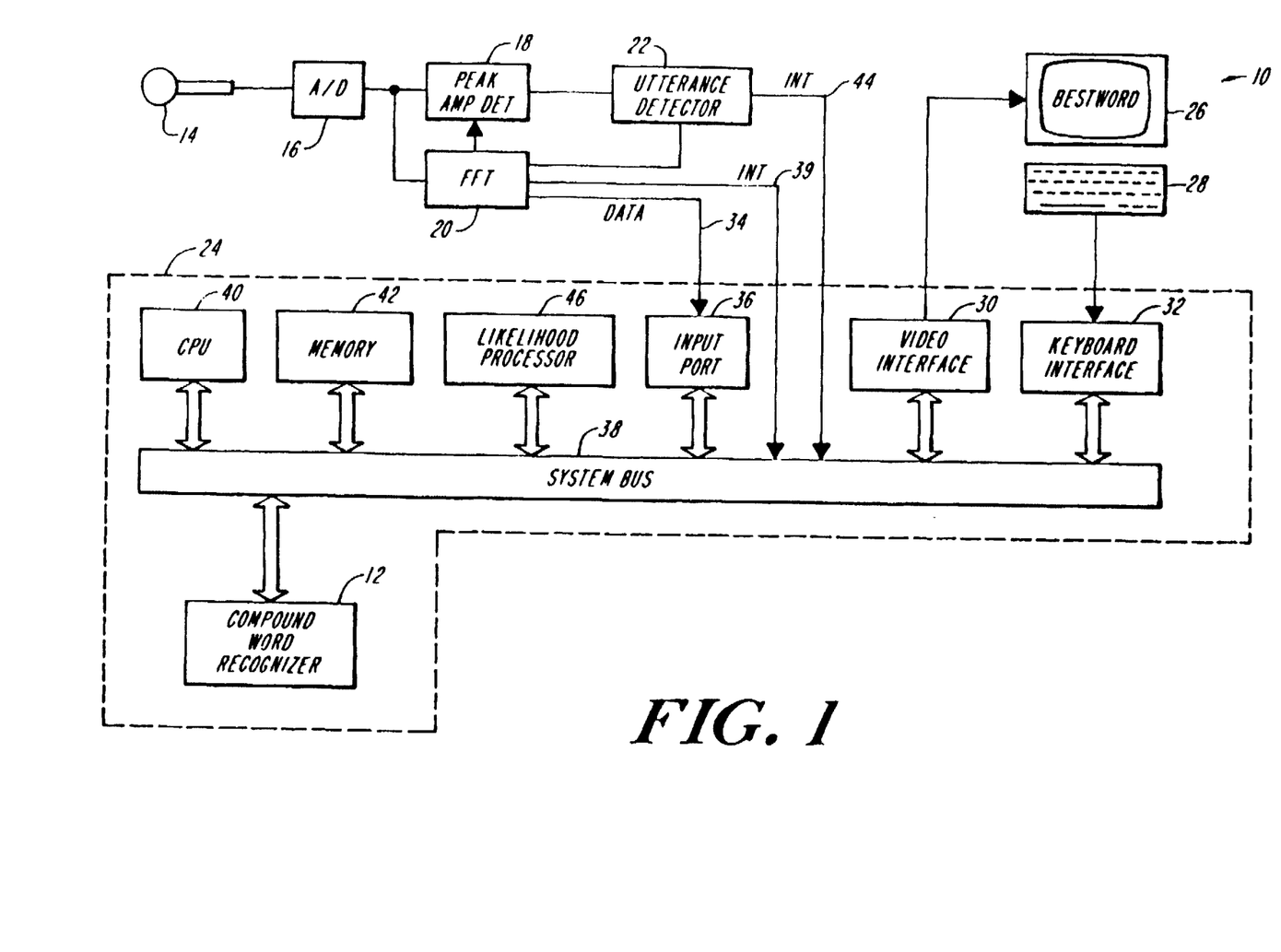
FIG. 1 shows a schematic diagram of a speech recognition system, including a compound word recognizer according to the present invention.

FIG. 1 shows a schematic block diagram of a speech recognition system 10, incorporating a compound word recognizer according to the invention. The system 10 includes elements for detecting an utterance of a spoken word and for generating digital signals representative of that utterance. Those elements include a microphone 14, an analog to digital converter 16, a peak amplitude detector 18, a fast Fourier transform (FFT) network 20 and an utterance detector 22. The signals produced by these elements are supplied to a programmable computer 24, such as an IBM compatible 386 or 486-type personal computer. The computer 24 is equipped with a video monitor 26 for displaying words recognized by the system 10. The computer 24 further includes a keyboard 26 to enable an operator to communicate with the computer 24 by means other than the microphone 14. The monitor 26, the keyboard 28 and their respective interfaces 30 and 32 are of a type commonly used with personal computers.

Spoken words enter the system 10 by way of the microphone 14. The microphone 14 generates an analog output signal indicative of spoken words entering it. The microphone output signal is connected to the input of the analog to digital converter 16. The analog to digital converter 16 converts the analog signal, produced by the microphone 14, into a sequence of digital values representative of the amplitude of the microphone output signal. The output of the analog to digital converter 16 is supplied to the inputs of the peak amplitude detector 18 and the fast Fourier transform network 20.

The fast Fourier transform network 20, which is of a type well known in the art, converts the output of the analog to digital converter 16 into a sequence of frames. Each frame is indicative of the amplitude of the microphone output signal at a particular frequency over a relatively short period of time. According to one embodiment of the invention, the Fourier transform network 20 outputs one frame every fiftieth of a second. This output is supplied, by way of data line 34 and input port 36, to the system bus 38 of computer 24. The Fourier transform network 20 also supplies an interrupt signal on an output line 39. That signal is coupled through the system bus 38 to the central processor unit 40 of computer 24. In response to the interrupt produced by the Fourier transform network 20, the central processor unit 40 reads the data representative of each successive frame, provided on line 34, and stores it in a random access memory 42. The Fourier transform network 20 also supplies the frame clock signals via line 44 to the peak amplitude detector 18.

The peak amplitude detector 18, of a type well known in the art of digital signal processing, supplies the peak amplitude value to the input of the utterance detector 22. The utterance detector 22, clocked by a signal from the Fourier transform network 20, compares the peak amplitude input to a predetermined threshold value. If the input to the utterance detector 22 exceeds the preset threshold value for a sufficient length of time, the utterance detector 22 generates an interrupt 44 at its output. That interrupt 44 signals the central processor 40 that the utterance detector 22 has detected what appears to be the beginning of an utterance.

The computer 24 also contains a likelihood processor 46. The likelihood processor 46 is a special-purpose processor designed to determine the words in the system dictionary which are most likely to correspond to a detected word uttered by the user. Typically the system dictionary contains both acoustic word models (i.e., an active library) and alphabetic word listings (i.e., a backup library). The likelihood processor 46 determines probable matches for the word uttered by comparing the data read by the central processor 40 against the pre-defined acoustic models stored in the random access memory 42. According to some prior art systems, the likelihood processor also searches the alphabetic word listings. Acoustic models are not typically stored for words contained in the alphabetic listings. Several search methodologies, utilizing the acoustic models and the alphabetic listings, have been employed in the prior art. These are discussed in more detail in U.S. Pat. No. 4,783,803; U.S. Pat. No. 4,866,778; and U.S. Pat. No. 5,027,406.

Also depicted in FIG. 1, is a compound word recognizer 12. The compound word recognizer 12, according to the invention, is responsible for recognizing compound words spoken by a user. As previously discussed, what constitutes a compound word may differ depending on the particular language in which the system 10 is operating. However, the term compound word, as it is used throughout the present application, refers generally to a word made up of a succession of two or more formatives, each of which is treated as a word in the system vocabulary.

Both the likelihood computations and the compound word recognizer computations tend to be processor intensive. Thus, the performance of the system 10 may be enhanced by assigning dedicated elements to perform those computations. However, as would be clear to one skilled in the art, those computations could just as well be performed by the central processor 40, under software control. Moreover, the compound word recognizer 12 may also be included as part of the likelihood processor 46.

Figure 2:
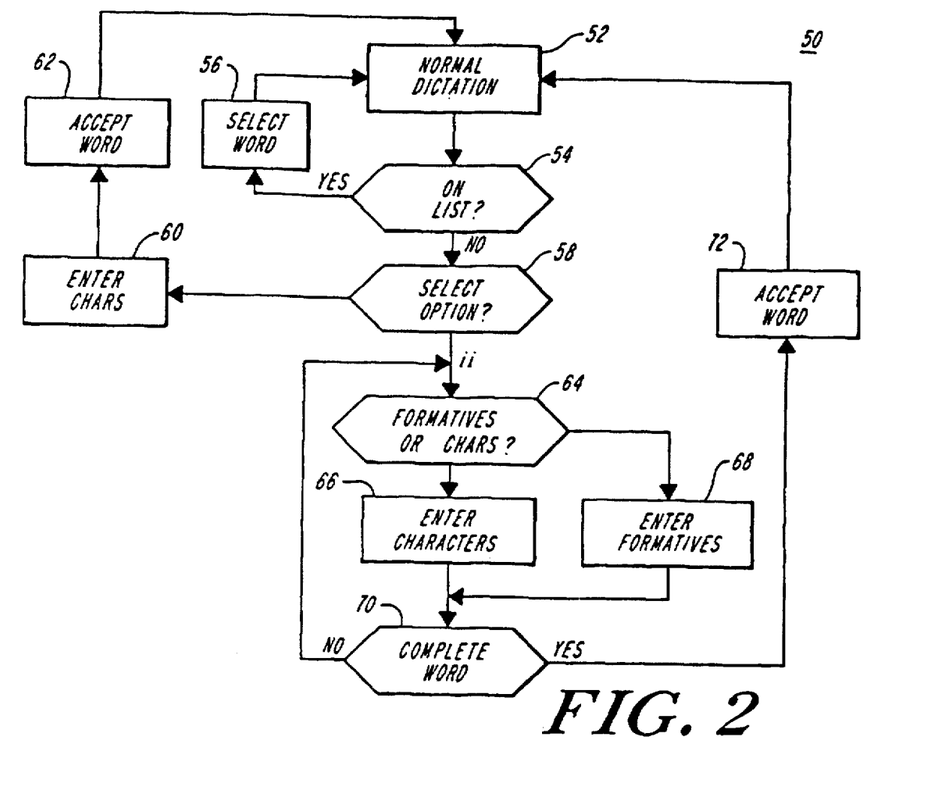
FIG. 2 is an operational flow diagram further illustrating the operation of the embodiment of FIG. 2.

FIG. 2 shows an operational flow diagram 50 according to one embodiment of the invention. The "Normal Mode" block 52, depicted in the flow diagram 50, represents prior art dictation systems. Typically, those systems are incapable of recognizing a compound word unless that word is stored in the system library, either as an acoustic model or as an alphabetic listing.

In operation, in response to an utterance made up of a succession of words, isolated or continuous, the Normal Mode system generates a candidate word list for each spoken word. As is shown by decision block 54, if a spoken word is on the displayed candidate list, then the word is selected 56 (either manually or automatically) and the system remains in normal dictation mode. However, if, as is likely with compound words, the uttered word is not on the displayed candidate list, the user may select from any one of several options 58. One option, shown by block 60, is for the user to enter a sequence of characters representative of the spoken compound word. This sub-mode of operation is referred to as "Spell Mode." Like the definition of a compound word, the definition of a character, may vary according to the language in which the user is operating. However, by way of example, in English a user may enter the spelling of the word, i.e., one letter at a time. Likewise, the user may employ the International Communication Alphabet (e.g., "alpha" for "a", "bravo" for "b", etc.). The user may then accept the correctly spelled word, as indicated by block 62, and return to the normal dictation mode.

A second option, indicated by decision block 64 is for a user to select a mode of operation wherein the particular compound word may be entered by speaking a combination of formatives and/or characters which comprise the compound word. According to one embodiment 68 of this option, a user speaks a series of formatives to be combined into a compound word. For example, a user might speak "through" followed by "put" to enter the compound word "throughput." In an alternate embodiment 66, the user may speak one or more characters in combination with one or more formatives which the word recognizer transforms into a compound word. For instance, a user might enter "s" "o" "c" "i" "o" followed by "cultural" to realize the word "sociocultural" and thus, avoid spelling the entire word. The user continues to enter formatives and/or characters until the compound word is completed. As shown by the decision block 70, upon completion of the compound word, the user accepts the word, indicated by block 72, and returns to normal dictation mode 52.

Figure 3:
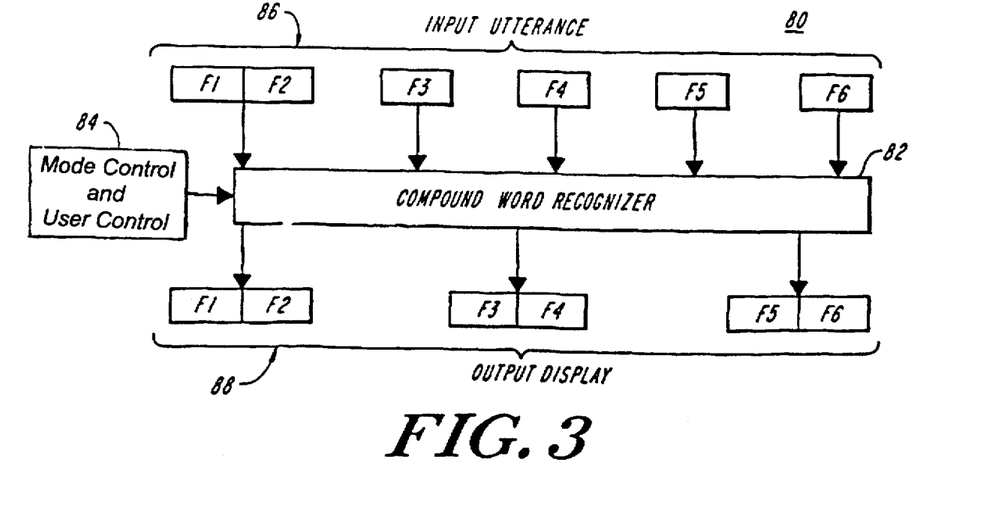
FIG. 3 is a block diagram illustrative of the operation of a preferred embodiment of the present invention in accord with the flow diagram of FIG. 2.

FIG. 3 shows a block diagram illustrative of the operation of a compound word recognizer system described by the flow diagram 50 of FIG. 2. As can be seen, the system 80 includes a compound word recognizer element 82 and user control element 84. Generally, the system 80 detects an input utterance 86, containing one or more formatives F1–F6, spoken either as continuous speech or in isolation. The compound word recognizer determines which of the formatives F1–F6 should be combined to form compound words and in response to that determination, combines those formatives into the proper compound words. This is illustrated by the combinations F1F2, F3F4 and F5F6 shown as output display 88 in FIG. 3.

As discussed above, the system 80 operates in any of several user selectable modes. The user selects the particular mode of operation by way of the user control element 84. The user control element 84 may be, for example, the microphone 14 or the keyboard 28, depicted in FIG. 1.

A first mode of operation is illustrated by the input formatives F1 and F2. Input formatives F1 and F2 represent a compound word, spoken as normal speech. According to the invention, if the word exists in either the active library or the backup library, the compound word recognizer 82 chooses that word from the library and displays it for the user, much in the same way that a non-compound word is identified and displayed in prior art systems.

In a second mode of operation, illustrated by input formatives F3 and F4, the word recognizer 82 combines into a compound word those formatives spoken between a spoken begin compound word delimiter and a spoken end of compound word delimiter. By way of example, a user might say "begin compound" "F3" "F4" "end compound." As is illustrated, in FIG. 3, this results in a compound word output display F3F4, representative of the combination of the input formatives F3 and F4.

In an alternate embodiment of the second mode of operation, a user may choose to combine both formatives and characters. For instance, the user might say "begin compound" "Arbeit" "Samuel" "Moral" "end compound." This results in the compound word "arbeitsmoral." In this example "Samuel" is the German Telephone Alphabet character for the letter "s." Other codes representative of characters may also be employed.

In a third mode of operation the word recognizer 82 automatically determines whether a series of sequentially spoken formatives should be combined and displayed for the user as a compound word. The word recognizer 82 accomplishes this by processing a succession of detected formatives and associating with each recognized formative, a score representative of the likelihood of the detected formative being included, in a compound word, with either of the formatives detected immediately before or after it. If it is more likely that the formatives should be combined as opposed to existing in isolation, then the word recognizer 82 combines the formatives into a compound word.

One technique used to determine the relative likelihoods of whether any group of formatives should exist in isolation or should be combined into a compound word is to use a language model. Language models predict the relative likelihood of the occurrence of each word in the system's vocabulary, given the one or more words which have been spoken previously.

In one embodiment of the third mode of operation, the compound word recognizer 82 is responsive to a user command to decompose, into its identified formatives, a previously identified compounded word.

Figure 4:
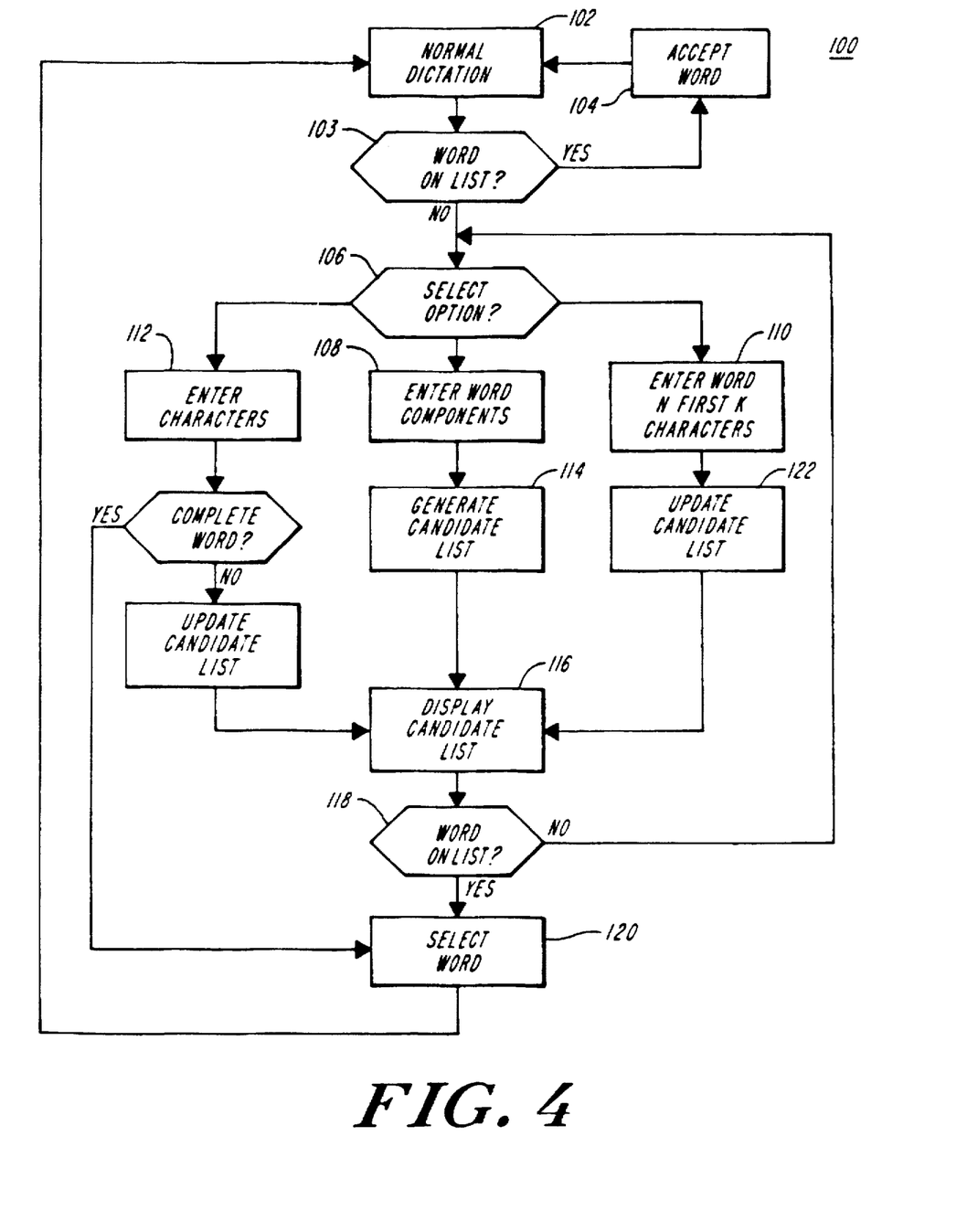
FIG. 4 is an operational flow diagram illustrating the operation of another preferred embodiment of the present invention.

FIG. 4 shows an operational flow diagram 100 according to an alternate embodiment of the invention. As in FIG. 2, the "Normal Mode" block 102, depicted in the flow diagram 100, represents prior art dictation systems. As in the embodiment of FIG. 2 and shown by decision block 103, if the uttered word is on the candidate list 103, the word is selected and the system remains in normal dictation mode. Also, like the embodiment of FIG. 2, if the word is not on the candidate list, the user has several options. That choice of options is represented by decision block 106. According to the embodiment of FIG. 4, the user may specify the compound word by way of word components or by specifying portions of words contained on the candidate list. Additionally, the user may complete a partially specified compound word by entering characters.

Word components include both formatives and characters. The user enters these formatives and/or characters much in the same as in the embodiment of FIG. 2. However, according to the embodiment of FIG. 4, the compound word recognizer 12 of FIG. 1 automatically generates a candidate list 114 and displays that list 116, in response to the characters and formatives entered by the user. According to one embodiment, the compound word recognizer 12 limits its search of the system library to words that begin with the formatives and/or characters entered by the user. However, in the case of formatives and/or characters, entered through spoken commands, the compound word recognizer may include in its search any formatives and/or characters which it determines has a substantial probability of being the one spoken. By entering additional characters and/or formatives, the user can further limit the scope of the word recognizer's search.

As indicated by decision block 118, if the compound word appears on the choice list, the user selects it 120. If the user selects a word off the candidate list, the system automatically returns to normal dictation mode 102. Alternately, if the word does not appear on the candidate list, the user may once again select any of the several options available from decision block 106.

According to the illustrated embodiment of FIG. 4, another option available to the user is to select a portion of a word which appears on the candidate list. This option is represented by block 110. Like with entering formatives, specifying a portion of a word on the candidate list can be a time saving alternative to spelling out an entire compound word character by character. As shown by block 110, the desired portion of a word on the candidate list is selected by specifying the word number (n) and the first (k) characters of the word. When a portion of a word is selected, the compound word recognizer 12 limits its searching to words in the system library beginning with the selected characters. Additionally, as shown by block 122, the word recognizer updates the candidate list accordingly. The updated candidate list is displayed for the user. Once again, if the compound word appears on the list, the user selects it and the system returns to normal dictation mode. If the word does not appear on the candidate list, the system returns to decision block 106 and allows the user to select the particular option to be employed.

According to other embodiments of the invention, the user may optionally select additional characters within the word selected from the candidate choice list. The user may also unselect characters previously selected. For example, a user may specify the first three characters of the second word in the candidate list. As previously discussed, the candidate list is updated accordingly. If the word is six characters long, the user may then command the system to go forward one, two or three characters, thereby effectively selecting the first four, five or six characters of the word, respectively. Likewise, the user may command the system to go backward one, two or three characters, thereby specifying the first two, one or zero characters in the word, respectively. The candidate choice list is updated with each new selection of characters.

A further option available from decision block 106 begins with block 112. This option allows the user to enter one or more characters to complete a compound word. As indicated by blocks 122 and 124, once the complete word has been entered, the user accepts the word and the system returns to the normal dictation mode.

Figure 5:
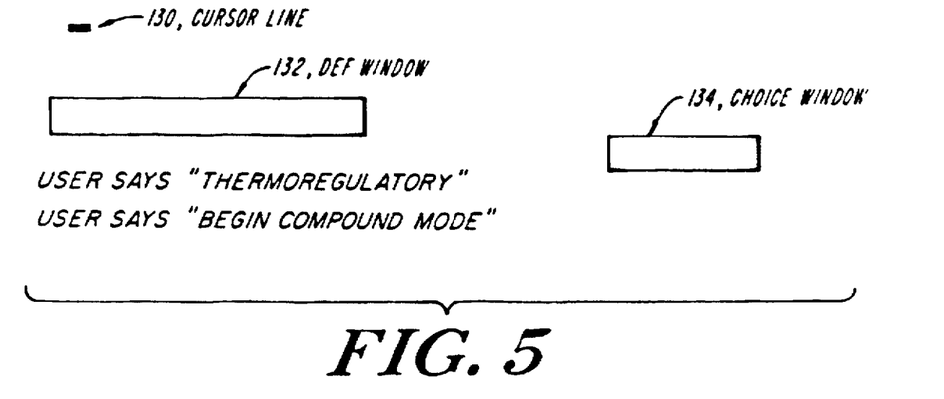
FIGS. 5–11 depict an example illustrative of the operation of a preferred embodiment of the present invention in accord with FIG. 4.

FIGS. 5–11 depict an example illustrating the operation of the embodiment of FIGS. 3 and 4. Throughout this example the words "enter and entering" are used to refer both to entering commands by speaking and also by using a keyboard. As depicted in FIG. 5, the user speaks the compound word "thermoregulatory." Assuming the word is not recognized, the cursor line 130 and the definition window 132, both remain blank. The choice window 134 may remain blank or may simply contain incorrect choices. According to the decision block 106 in FIG. 4, the user selects between any one of several options. In the example of FIG. 5, the user chooses to enter word components by entering the command "Begin Compound Mode."

Figure 6:
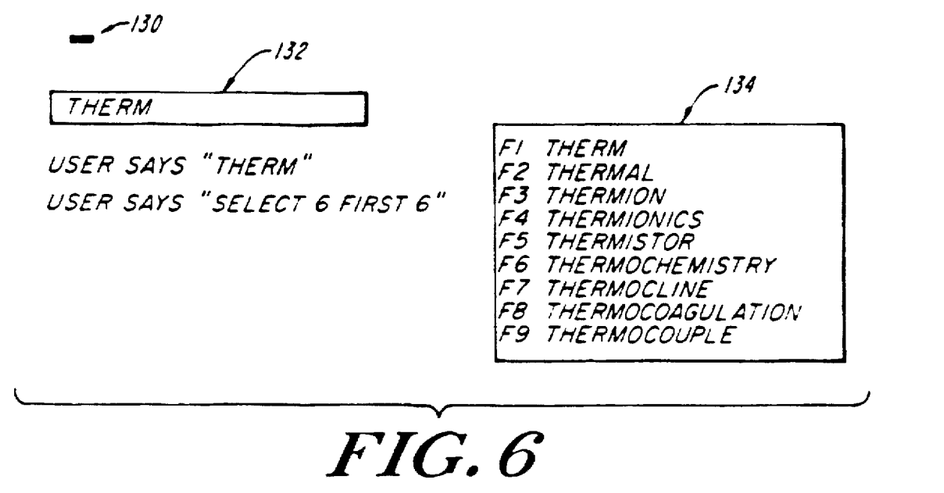

The user has the option of entering word components which are characters or those which are formatives. In the example of FIG. 6, the user enters the formative "therm". This causes the compound word recognizer to search the dictionary for words beginning with the formative "therm".

Additionally, "therm" is displayed in the definition window 132. According to the depicted embodiment, nine likely candidates are displayed in the choice window 134, preferably in an ordered manner based on likelihood of occurrence values. Although, in the depicted example the word recognizer has correctly identified the formative "therm," under certain conditions the recognizer might determine that there exists a substantial probability that the spoken formative was other than "therm." For example, the recognizer might identify "term" or "derm" to be equally probable choices. In that situation the word recognizer, according to one preferred embodiment, displays the most likely choices given the probabilities which it has assigned to both the initial spoken word (e.g., thermo regulatory) and the spoken formative (e.g., therm).

While the desired word is not displayed in the choice window 134, the user has the option of selecting a portion of any of the displayed choices. In this case the user enters the command "select six first six." This selects the first six letters of the sixth word of the choice list.

Figure 7:
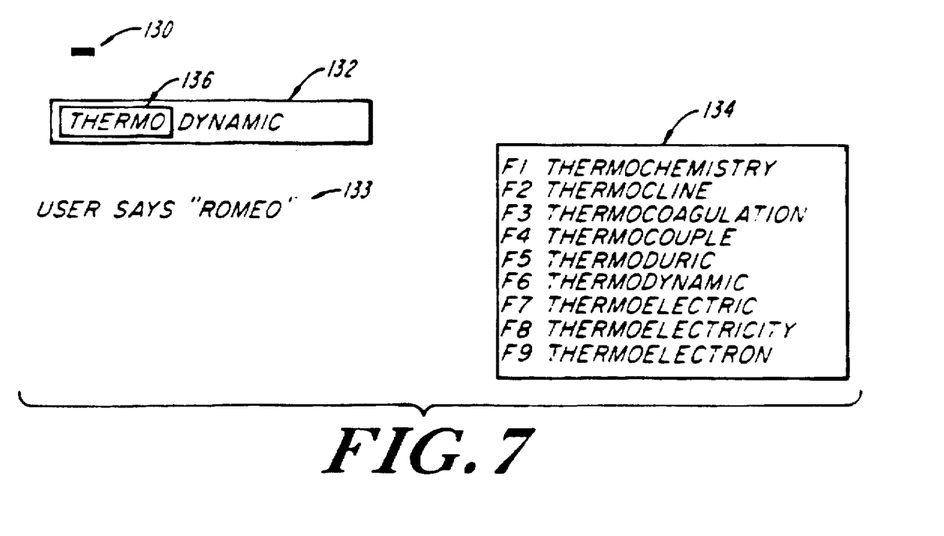

The resulting definition window 132, containing the sixth candidate, thermodynamic, with the first six characters (e.g., "thermo") delineated, is shown at 136 in FIG. 7. The selection of "thermo" causes the compound word recognizer to update the candidate list shown in the choice window 134. As can be seen in FIG. 7, all nine choices now begin with the formative "thermo." Since none of the choices of FIG. 7 have in excess of the first six letters in common with "thermoregulatory," the user exercises the option to enter word components that are characters.

In prior art systems, which employ a "spell mode" option, the characters spelled out by the user are placed at the beginning of the word to be identified, unless otherwise specified. However, according to the present invention, if the spell character 135 immediately follows a previously spoken formative, such as "therm," the spell character is presumed to follow the spoken formative, unless otherwise specified by a user. If the spell character immediately follows a command such as "select six, first six," the spell character is presumed to follow the selected characters (e.g., the seventh character of the sixth word in the present example). If the spell character is not preceded by a formative or a select type command, the spell character, as in the prior art systems, is placed at the beginning of the word to be recognized.

In the example of FIG. 7 the user enters the character "r" by way of its corresponding International Communication Alphabet character (e.g., romeo). In other embodiments, the International Communication Alphabet is employed to enter West European alphabet characters. Of course, for other languages different characters/symbols may be used.

Figure 8:
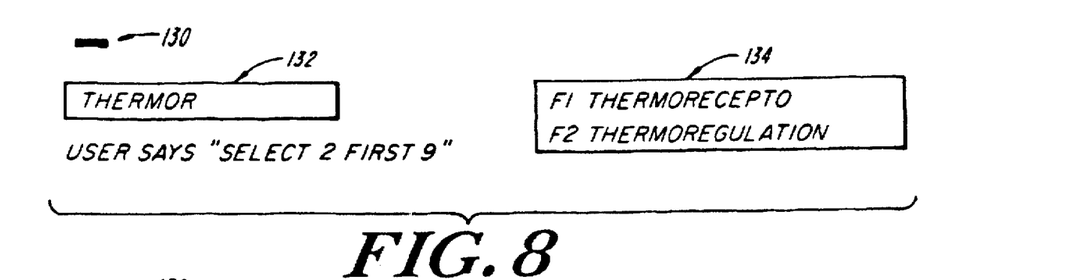

As shown in FIG. 8, the compound word recognizer incorporates the "r" into the definition window 132 thereby eliminating the "dynamic" portion of "thermodynamic." The word recognizer also updates the candidate list displayed in the choice window 134. The user then exercises the option of selecting the first nine letters of the second word.

Figure 9:
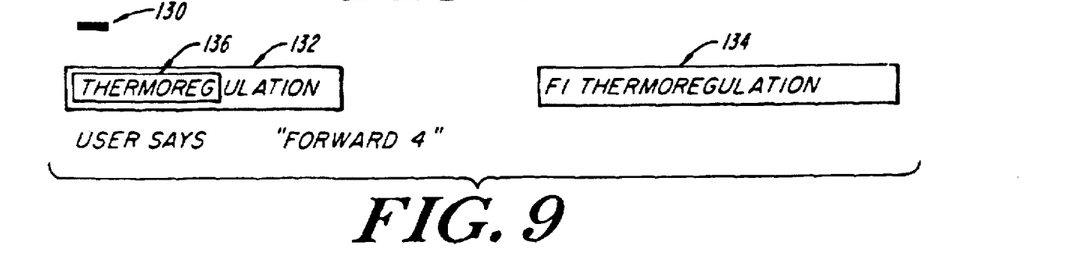

Accordingly, FIG. 9 shows the word "thermoregulation" in the definition window 132 with the letters "thermoreg" delineated at 136. The choice window contains the only candidate having "thermoreg" as its first nine characters. Realizing that the second selection of FIG. 8, still shown in the definition window 132 of FIG. 9, has in excess of the first nine letters in common with the desired compound word, the user enters the command "forward four."

Figure 10:
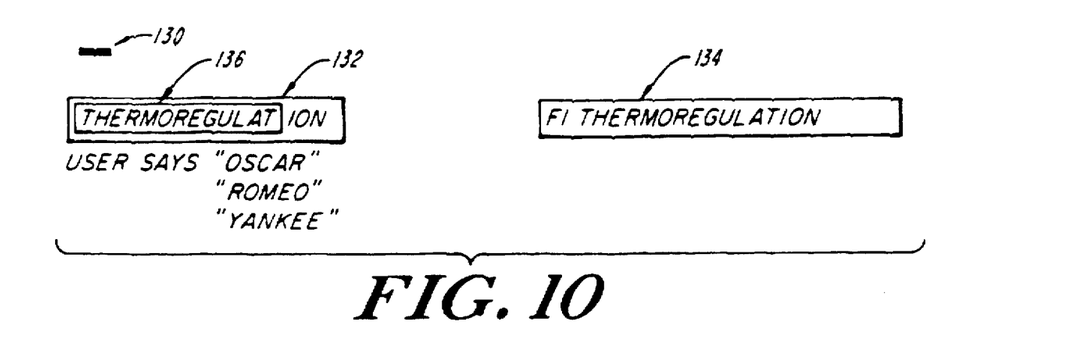
Figure 11:
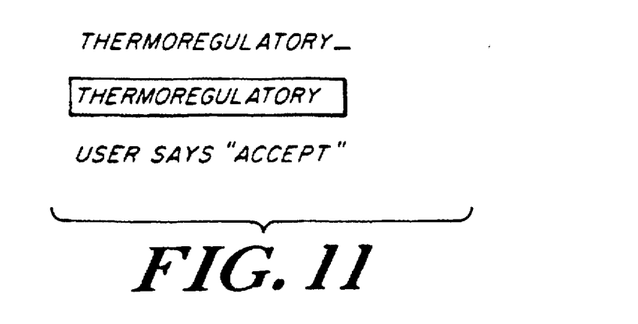

As depicted in FIG. 10, this results in an additional four letters being included in the delineated portion 136 of the definition window 132. Similarly, if a user realizes that too many characters have been mistakenly included, a "back" command releases letters previously selected. By way of example a "back four" command would result releasing the characters "oreg" included in the delineated portion 136 of definition window 132 of FIG. 9.

Following the "forward four" command, no further choices are available that contain additional letters in common with the desired compound word. Thus, the user enters the spelling mode once again and completes the word. Subsequent to entering the remaining letters "o" "r" "y," by way of their International Communication Alphabet symbols, the user accepts the completed word displayed in the definition window 132 of FIG. 11. Accordingly the word in the definition window 132 is transferred to the cursor line 130.

The invention may be embodied in other specific forms without departing from the spirit or essential characteristics thereof. The current embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for recognizing compound words from an utterance representative of a succession of one or more formatives from a predetermined vocabulary, wherein each of said formatives has an associated acoustic model stored in memory, comprising:

A. a word recognizer including means:
  i. selectively operative in a first mode for matching formatives of said utterance with said associated acoustic models according to a score representative of the likelihood of a formative being included in a compound word with other said formatives, for identifying said acoustic models and said associated matched formatives that are representative of a single compound word, and for combining said formatives in response to said identification for generating a single compound word,
  ii. selectively operative in a second delimiting mode for matching said spoken formatives of said utterance with said associated acoustic models for identifying a Begin Compound Mode command which indicates the beginning of a compound word and an End Compound Mode command which indicates the end of a compound word, and for combining in response to the identification of said Begin Compound Mode command and said End Compound Mode command formatives spoken between said Begin Compound Mode command and said End Compound Mode command into a single compound word, and B. a user interface, including means for selecting between said first mode and said second mode.

2. A system according to claim 1 wherein said user interface includes a microphone and is responsive to a user generated auditory signal to select between said first mode and said second mode.

3. A system according to claim 1 wherein said user interface includes a keyboard and is responsive to a user generated keyboard command to select between said first mode and said second mode.

4. A system according to claim 1 wherein said word recognizer in said second mode is selectively operative in a sub-mode for identifying as a character in said compound word keywords spoken between said first delimiter and said second delimiter, wherein each of said keywords is representative of a correspondingly positioned character in said compound word.

5. A system according to claim 4 wherein one or more of said keywords are International Communication Alphabet words.

6. A system according to claim 1 wherein said word recognizer is selectively operative in a third mode for identifying as a character in said compound word keywords entered by a user between said first delimiter and said second delimiter, wherein each of said keywords is representative of a correspondingly positioned character in said compound word.

7. A system according to claim 6 wherein said user interface includes a microphone and said keywords are entered through said microphone.

8. A system according to claim 6 wherein said user interface includes a keyboard and said key words are entered through said microphone.

9. A system according to claim 6 wherein one or more of said keywords are International Communication Alphabet words.

10. A system according to claim 1 wherein said word recognizer includes means for recognizing said compound words from said utterance, wherein said utterance contains one or more words spoken in isolation.

11. A system according to claim 1 wherein said word recognizer includes means for recognizing said compound words from said utterance, wherein said utterance contains one or more words spoken as continuous speech.

12. A system according to claim 1 wherein said means for identifying said acoustic models that are matched to successively spoken formatives that are representative of a single compound word performs said identification based at least in part on a language score which corresponds to a language model probability estimate of the probability that said single compound word would occur given a language context derived from one or more of said successively spoken formatives.

13. A system according to claim 1 wherein said means for identifying said acoustic models that are matched to successively spoken formatives that are representative of a single compound word performs said identification based at least in part on a language score which corresponds to a language model probability estimate of the probability that said single compound word would occur given a language context derived from one or more formatives which have preceded said single compound word.

14. A computer-implemented method for recognizing compound words from an utterance representative of a succession of one or more formatives from a predetermined vocabulary, wherein each of said formatives has an associated acoustic model stored in memory, comprising the steps of:

A. recognizing said compound words by:
  i. selectively operating said computer in a first mode to match each of said spoken formatives to an associated acoustic model, to automatically identify ones of said acoustic models and said associated matched formatives that are representative of a single compound word according to a score representative of the likelihood of a formative being included in a compound word with other said formatives, and to combine said formatives in response to said identification,
  ii. selectively operating said computer in a second delimiting mode to match one of said acoustic models to each of said spoken formatives to identify a spoken Begin Compound Mode command which indicates the beginning of a compound word and a spoken End Compound Mode command which indicates the end of a compound word, and to combine a succession of formatives matched to ones of said associated acoustic models spoken between said Begin Command Mode command and said End Compound Mode command into a single compound word.

15. The method according to claim 14 including the further step of selecting between said first and second modes in response to a user generated auditory signal.

16. The method according to claim 14 including the further step of selecting between said first and second modes in response to a user generated keyboard command.

17. The method according to claim 14 wherein operation in said second mode includes the further step of selectively operating in a sub-mode to identify as a character in said compound word keywords spoken between said first delimiter and said second delimiter, wherein each of said keywords is representative of a correspondingly positioned character in said compound word.

18. The method according to claim 17 wherein one or more of said keywords are International Communication Alphabet words.

19. The method according to claim 14 including the further step of selectively operating in a third mode to identify as a character in said compound word keywords entered by a user between said first delimiter and second delimiter, wherein each of said keywords is representative of a correspondingly positioned character in said compound word.

20. The method according to claim 19 including the further step of entering said keywords through user generated auditory signals.

21. The method according to claim 19 including the further step of entering said keywords through user generated keyboard commands.

22. The method according to claim 19 wherein one or more of said keywords are International Communication Alphabet words.

23. The method according to claim 14 including the further step of speaking one or more of said words as isolated words.

24. The method according to claim 14 including the further step of speaking one or more of said words as continuous speech.

* * * * *